(12) United States Patent
Gutzmer et al.

(10) Patent No.: US 12,717,340 B2
(45) Date of Patent: Aug. 25, 2026

(54) AUTOMATICALLY GUIDED VEHICLE

(71) Applicant: Siemens Aktiengesellschaft, Munich (DE)

(72) Inventors: Marcus Gutzmer, Garbsen (DE); Uwe Krause, Pattensen (DE); Andreas Lüddeke, Hannover (DE)

(73) Assignee: Siemens Aktiengesellschaft, Munich (DE)

( * ) Notice: Subject to any disclaimer, the term of this patent is extended or adjusted under 35 U.S.C. 154(b) by 34 days.

(21) Appl. No.: 18/834,914

(22) PCT Filed: Dec. 27, 2022

(86) PCT No.: PCT/EP2022/087894
§ 371 (c)(1),
(2) Date: Jul. 31, 2024

(87) PCT Pub. No.: WO2023/147934
PCT Pub. Date: Aug. 10, 2023

(65) Prior Publication Data

US 2025/0181072 A1 Jun. 5, 2025

(30) Foreign Application Priority Data

Feb. 1, 2022 (EP) .................................... 22154552

(51) Int. Cl.
*G05D 1/245* (2024.01)
*G05D 105/28* (2024.01)
(Continued)

(52) U.S. Cl.
CPC ......... *G05D 1/245* (2024.01); *G05D 2105/28* (2024.01); *G05D 2107/70* (2024.01); *G05D 2111/52* (2024.01)

(58) Field of Classification Search
None
See application file for complete search history.

(56) References Cited

U.S. PATENT DOCUMENTS

2004/0177691 A1* 9/2004 Kunda .................. G01D 3/032 73/514.35
2008/0150468 A1 6/2008 Kalender
(Continued)

FOREIGN PATENT DOCUMENTS

CN 109189073 A * 1/2019 ........... G05D 1/0246
CN 110579192 A * 12/2019 ......... G05B 19/4061
(Continued)

OTHER PUBLICATIONS

PCT International Search Report and Written Opinion of International Searching Authority mailed Feb. 3, 2023 corresponding to PCT International Application No. PCT/EP2022/087894 filed Dec. 27, 2022.

*Primary Examiner* — Amelia Vorce
(74) *Attorney, Agent, or Firm* — Henry M. Felereisen LLC

(57) ABSTRACT

An automatically guided vehicle designed as a floor-bound conveying means which is automatically controlled and guided in a contact-free manner for use in a hall includes a travel drive having a travel converter and a dynamo-electric machine, with the travel converter including a printed circuit board. The dynamo-electric machine is connected to wheels of the vehicle. A sensor is arranged or formed in the travel converter on the printed circuit board of the travel converter and designed to detect an acceleration of the vehicle in x, y and/or z direction and/or detect a spatial location of the vehicle.

8 Claims, 2 Drawing Sheets

(51) Int. Cl.

| | |
|---|---|
| ***G05D 107/70*** | (2024.01) |
| ***G05D 111/50*** | (2024.01) |

(56) References Cited

U.S. PATENT DOCUMENTS

| | | | | |
|---|---|---|---|---|
| 2015/0081931 | A1* | 3/2015 | Tang | G06F 11/3048 710/18 |
| 2015/0168953 | A1* | 6/2015 | Smid | B62D 37/00 701/28 |
| 2016/0370779 | A1* | 12/2016 | Wang | G05B 19/0423 |
| 2019/0079112 | A1* | 3/2019 | Bjornsson | G05D 1/0875 |
| 2019/0226848 | A1* | 7/2019 | Nasiri | G01P 15/125 |
| 2019/0384323 | A1* | 12/2019 | Kuroda | G01S 17/42 |
| 2019/0391598 | A1* | 12/2019 | Murakoshi | G05D 1/0808 |
| 2020/0003560 | A1* | 1/2020 | Mayer | H03D 3/244 |
| 2020/0262555 | A1* | 8/2020 | Wang | B64U 20/83 |
| 2020/0293041 | A1* | 9/2020 | Palanisamy | G06N 3/08 |
| 2023/0025507 | A1* | 1/2023 | Austrheim | B65G 1/065 |
| 2023/0259138 | A1* | 8/2023 | Chen | G06V 10/80 700/245 |

FOREIGN PATENT DOCUMENTS

| | | | | |
|---|---|---|---|---|
| EP | 3428578 | A1 * | 1/2019 | G01C 21/166 |
| EP | 3586212 | B1 * | 9/2021 | B64U 10/60 |
| GB | 2 465 020 | A | 5/2010 | |
| JP | 2011503522 | A * | 1/2011 | G01P 1/023 |

* cited by examiner

AUTOMATICALLY GUIDED VEHICLE

CROSS-REFERENCES TO RELATED APPLICATIONS

This application is the U.S. National Stage of International Application No. PCT/EP2022/087894, filed Dec. 27, 2022, which designated the United States and has been published as International Publication No. WO 2023/147934 A1 and which claims the priority of European Patent Application, Serial No. 22154552.8, filed Feb. 1, 2022, pursuant to 35 U.S.C. 119(a)-(d).

BACKGROUND OF THE INVENTION

The invention relates to an automatically guided vehicle.

Known from the unexamined patent application GB2465020A is an electrically propelled vehicle having two or more in-line wheels, one or more of said wheels being rotatable about a vertical axis in order to allow steering of the vehicle. Electric traction motors are coupled to the wheels and are capable of effecting forward and reverse motion and capturing kinetic energy upon deceleration of the vehicle. Provision is made for a balancing mechanism as part of an automatic control system, optionally in the form of a time-discrete controller, which uses sensors such as e.g. lateral accelerometers to estimate the roll moment of the vehicle in real time and shifts the center of mass of the vehicle laterally, preferably by moving the vehicle batteries laterally by means of electric motors. The balancing mechanism is capable of imparting dynamic balancing forces to the vehicle, optionally by way of a pair of gyroscopes in a module which are rotated about their axes of precession in order thus to maintain the vehicle upright or in any other desired orientation.

The detection of acceleration relative to the three spatial axes on electrically driven vehicles with travel converters is conventionally effected by means of discrete sensors and associated evaluation electronics. These discrete sensors are arranged outside the travel converter.

This Is however disadvantageous because it increases the cabling expense and requires an additional evaluation unit. This involves considerable expense and is moreover cost-intensive.

The object of the invention is therefore to improve an automatically guided vehicle in this regard.

SUMMARY OF THE INVENTION

The object is achieved by an automatically guided vehicle having:

- at least one travel drive with a travel converter,
- at least one sensor, said sensor being designed to detect an acceleration of the vehicle in x, y and/or z direction and/or a spatial location of the vehicle, said at least one sensor being arranged or formed in the travel converter on a printed circuit board of the travel converter.

The spatial location is preferably available as a vector in an xyz system of coordinates.

Acceleration and spatial location can be converted into each other by means of transformation.

An automatically guided vehicle is advantageously a floor-bound conveying means which has a travel drive of its own and is controlled automatically and guided in a contact-free manner. The automatically guided vehicle is also referred to by the terms “Driverless Transport Vehicle” (DTV) and “Automated Guided Vehicle” (AGV). It is advantageously used for materials transport, e.g. for pulling or carrying transport goods using active or passive load handling means.

Driverless Transport Systems (DTS) are advantageously in-plant floor-bound materials handling systems comprising at least one automatically guided vehicle, preferably a plurality of automatically guided vehicles, whose primary task is preferably materials transport. They can be deployed inside and outside buildings, and advantageously have one or more automatically guided vehicles, advantageously a master controller, advantageously a device for site identification and location detection, advantageously a device for data transfer, and advantageously an infrastructure and peripheral devices.

According to an advantage embodiment, the sensor is designed as an acceleration sensor.

The sensor can be designed as an angular acceleration sensor.

According to an advantageous embodiment, the sensor is designed as a spatial location sensor, in particular a gyroscope.

The acceleration sensor is preferably designed as a MEMS acceleration sensor. This preferably measures the displacement of a mass, in particular the mass of the vehicle, by way of a position measuring circuit. For subsequent digital processing, the measured signal can be converted into digital Information with the aid of an A/D converter.

By contrast, a gyroscope measures displacement of a resonance mass, preferably of the vehicle, and its suspension following the Coriolis acceleration.

The sensor is advantageously formed or arranged on a printed circuit board of the travel converter, and is therefore advantageously realized within the travel converter.

The sensor is thereby advantageously connected to an administrative controller by means of PROFIsafe or other security profile for transferring safety-related data.

According to an advantageous embodiment, the automatically guided vehicle has an evaluation unit which is designed to evaluate at least one detected acceleration in x, y and/or z direction and/or to evaluate the detected spatial location.

The evaluation unit is advantageously realized in the converter. In order to realize a fail-safe evaluation by means of two channels, the sensors are advantageously embodied with redundancy.

For the purpose of activating semiconductor elements of the travel converter, in particular transistors, the travel converter comprises a control unit. In an advantageous embodiment variant of the invention, the evaluation unit is comprised in the control unit of the travel converter or is integrated in the control unit of the travel converter. Consequently, no additional hardware (digital signal processor, data memory, etc.) is required for the purpose of signal evaluation, since the already available control unit of the travel converter can be used for this purpose.

The vehicle advantageously has at least one sensor per direction, said sensor being designed to detect the acceleration of the vehicle in x, y and/or z direction.

Alternatively or additionally, the vehicle can also have at least one sensor, said sensor being designed to detect the acceleration of the vehicle in x, y and z direction.

In other words, this means that: a sensor can detect one direction, a sensor can also detect two directions, or a sensor can detect all three directions.

According to a particularly advantageous embodiment, however, the vehicle has two or more sensors per direction, said sensors being designed to detect the acceleration of the vehicle in x, y and/or z direction.

In other words, this means that for example: provision is advantageously made for two sensors, of identical structure or design, for example, which detect the x direction. Or: provision is advantageously made for two sensors, of Identical structure or design, for example, which detect the x direction and the y direction. Or: provision is advantageously made for two sensors, of identical structure or design, for example, which detect the x direction and the y direction and the z direction.

The following exemplary embodiment is however preferred: provision is advantageously made for two sensors, which are not of identical structure or which work differently, and which detect the x direction. Or: provision is advantageously made for two sensors, which are not of identical structure or which work differently, and which detect the x direction and the y direction. Or: provision is advantageously made for two sensors, which are not of identical structure or which work differently, and which detect the x direction and the y direction and the z direction.

It is thereby possible reliably to detect an acceleration in a direction in the event that, for example, one of the sensors suffers from a fault.

According to a further advantageous embodiment, the vehicle has two or more sensors which are designed to detect the spatial location.

A redundant embodiment of a spatial location sensor is advantageous from a safety perspective.

It is possible for the vehicle to only have at least one acceleration sensor, preferably two or more acceleration sensors for reasons of safety, and no spatial location sensor.

It is possible for the vehicle to only have at least one spatial location sensor, preferably two or more spatial location sensors for reasons of safety, and no acceleration sensor.

It is however also possible for the vehicle to have both at least one acceleration sensor, preferably two or more acceleration sensors for reasons of safety, and at least one spatial location sensor, preferably two or more spatial location sensors for reasons of safety.

According to an advantageous embodiment, the travel converter is mechanically connected to the vehicle.

In other words, this means that the travel converter is coupled to the vehicle in a mechanically fixed or mechanically rigid manner. This has the advantage that detection errors caused by sensors moving relative to the vehicle are avoided.

According to a further advantageous embodiment, the at least one acceleration sensor is formed in the travel converter.

Realization of the sensor or sensors in the travel converter, i.e. within the travel converter, has the advantage that data can be captured directly via a microcontroller and reliably communicated to a controller by means of PROFIsafe.

The object is further achieved by a travel converter for an automatically guided vehicle, which travel converter has at least one sensor, said sensor being designed to detect an acceleration of the vehicle in x, y and/or z direction and/or to detect a spatial location of the vehicle, said at least one sensor being arranged or formed in the travel converter on a printed circuit board of the travel converter.

BRIEF DESCRIPTION OF THE DRAWING

The invention is described and explained in greater detail below with reference to exemplary embodiments illustrated in the figures, in which.

DETAILED DESCRIPTION OF PREFERRED EMBODIMENTS

Figure 1:
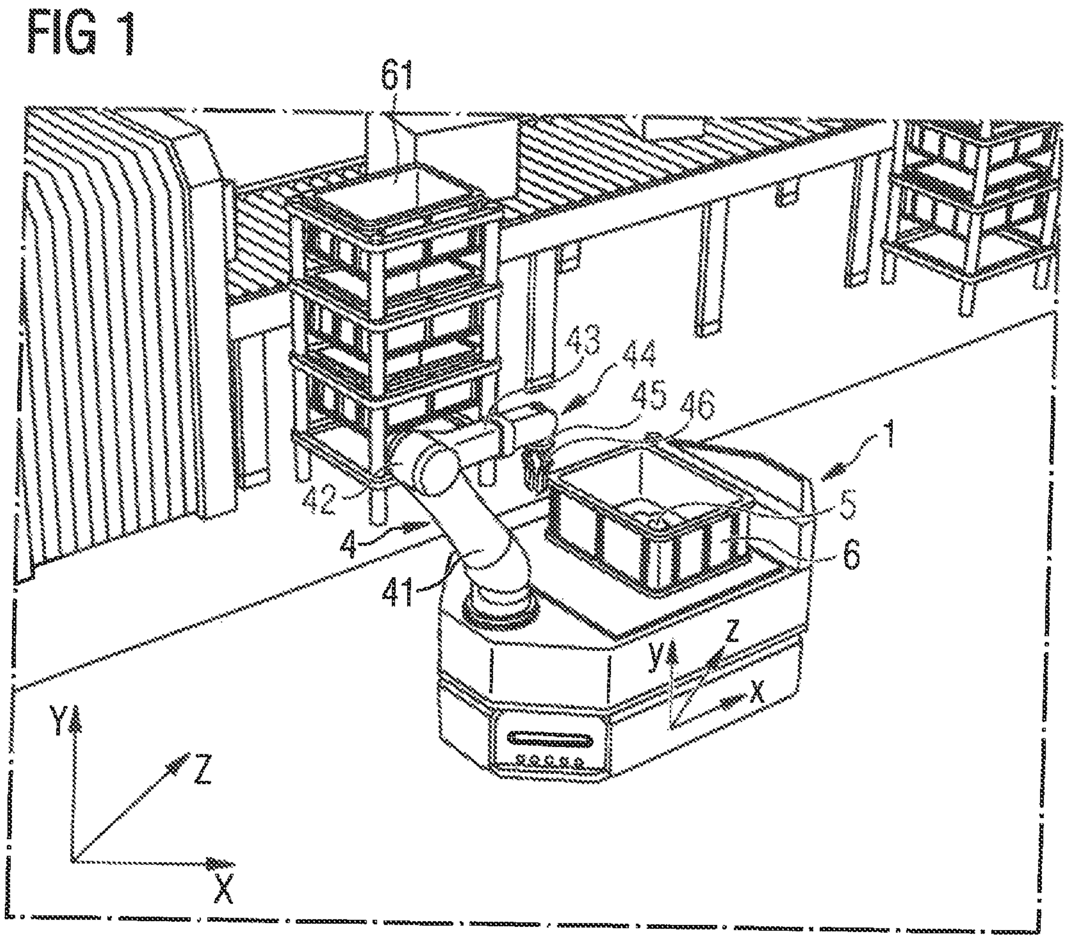
FIG. 1 shows an automatically guided vehicle.

FIG. 1 shows an automatically guided vehicle 1.

Automatically guided vehicles are also designated by the term Automated Guided Vehicle. Automatically guided vehicles 1 are usually floor-bound conveying means having their own travel drive.

Figure 2:
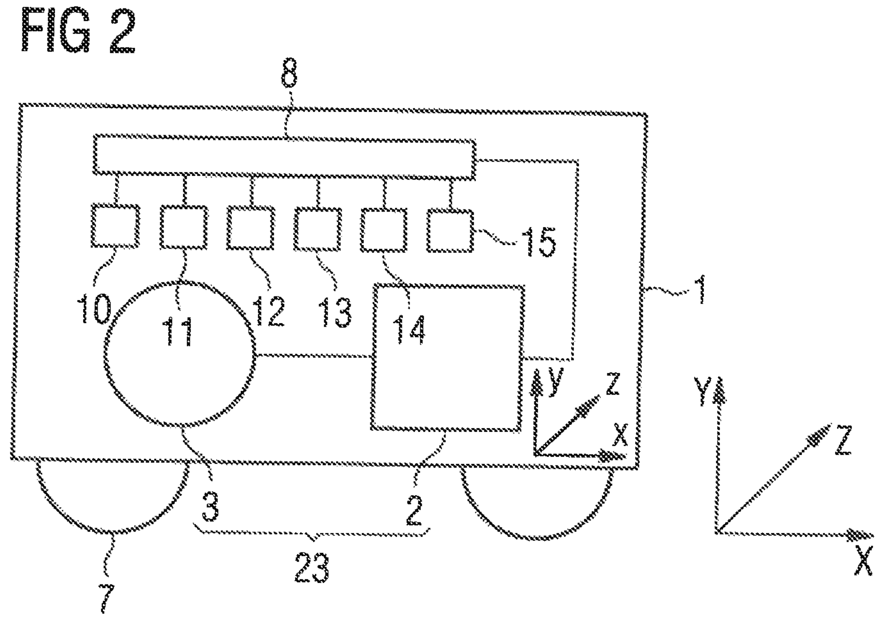
FIG. 2 shows an automatically guided vehicle in detail.

As shown in the figure, the travel drive has a dynamo-electric machine 3, advantageously a dynamo-electric rotary machine, and a travel converter 2 (see FIG. 2).

The vehicle 1 is controlled automatically and is advantageously guided in a contact-free manner. Materials and workpieces can therefore be transported without a driver.

The figure shows the vehicle 1 transporting a crate 6 in which workpieces 5 are placed.

The figure shows an absolute system of coordinates XYZ and a relative system of coordinates xyz of the vehicle. Each system of coordinates can be converted into the other. This is required for the purpose of mapping a factory building, for example. This is explained further below.

In the embodiment shown, the automatically guided vehicle 1 also has a robot arm 4. The robot arm 4 has an upper arm 41, a lower arm 43 and a grabber 45, these being interconnected by means of the joints 42, 44, 46 and movable in various directions.

Therefore workpieces 5 can be transferred out of the crate 6 and into a crate 61, for example.

FIG. 2 shows the automatically guided vehicle 1 in detail.

The vehicle 1 has a travel drive 23 with a travel converter 2 and a dynamo-electric machine 3. The dynamo-electric machine 3 is advantageously connected to the wheels 7, by means of a shaft, for example.

It is possible here to provide a single drive for the wheels 7. It is also possible to provide a drive for two wheels on an axle, for example, a rear axle.

It is also conceivable to provide a plurality of drives.

By way of example, the figure shows a plurality of sensors 10, 11, 12, 13, 14, 15, these being advantageously designed as acceleration sensors.

The acceleration sensors 10 and 11 are configured to measure or detect an acceleration in x direction.

The acceleration sensors 12 and 13 are configured to measure or detect an acceleration in y direction.

The acceleration sensors 14 and 15 are configured to measure or detect an acceleration in z direction.

Information obtained by the acceleration sensors 10, 11, 12, 13, 14, 15 is evaluated by an evaluation unit 8 in the figure.

According to a particularly advantageous embodiment, the evaluation unit 8, also situated e.g. in the travel converter 2 (see FIG. 3), is constructed in a fall-safe manner, in particular by means of a two-channel structure. The detection of the acceleration can therefore take place in a fail-safe manner because, as shown in the figure, two sensors per direction are provided.

Figure 3:
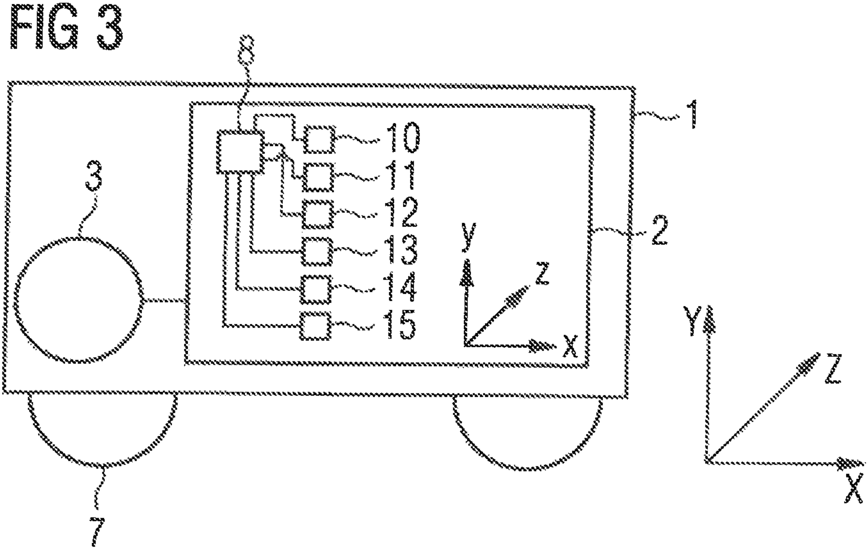
FIG. 3 shows a further embodiment variant of the automatically guided vehicle.

FIG. 3 shows a further embodiment variant of the automatically guided vehicle 1.

In this embodiment, the acceleration sensors 10, 11, 12, 13, 14, 15 and the evaluation unit are realized in the travel converter 2.

The invention offers many advantages. In particular, this embodiment variant has the advantage of saving costs, since cabling is omitted and an additional evaluation unit is not required because this is already realized in the travel converter.

By virtue of the two-channel structure shown in the figure, fail-safe detection is possible.

It is additionally possible to ascertain a detection of vehicle tilt in a direction of travel. This means that an incline or a gradient can be detected.

During actual standstill of the vehicle, it is possible to identify any unintended rolling away and to selectively prevent such unintended rolling away.

During travel, it is possible to predict the required braking distance as a function of the speed.

In addition, it is also possible to detect a vehicle tilt perpendicular to the direction of travel, i.e. a lateral tilt. Both at standstill and during travel of the vehicle, selective identification and prevention of any unintended tipping of the vehicle is possible.

The invention also offers the advantage that an absolute course or a change of course can be detected. It is thus possible to prevent any tipping of the vehicle. The data can also be used for the purpose of mapping, for example, mapping a factory building.

This is advantageously achieved by means of zero point calibration. At a point in time, it is advantageously assumed that the AGV is then situated in an absolute zero point position, i.e. advantageously: x_absolute=0; y_absolute=0; z_absolute=0. The detected values for the x or y or z directions can be converted into absolute coordinates thus.

In unknown buildings, it is possible to identify and take note of an incline, for example, since a current location of the vehicle is known.

The invention also offers the advantage that oscillations can be detected and therefore dynamic instabilities such as wobbling and swinging can be Identified and prevented.

The invention also offers the advantage that the safety function SLA (Safely Limited Acceleration) can be implemented. Limitation of the actual physical transformational acceleration is possible; acceleration and speed of the vehicle can be restricted. This is particularly important for the transportation of hazardous goods or components and materials which are only permitted to undergo a specific acceleration.

The described sensor advantageously measures the acceleration directly. Mathematical calculation from the speed, which can be susceptible to error, does not take place.

With regard to SLA in particular, the present invention is safer and more reliable.

Figure 4:
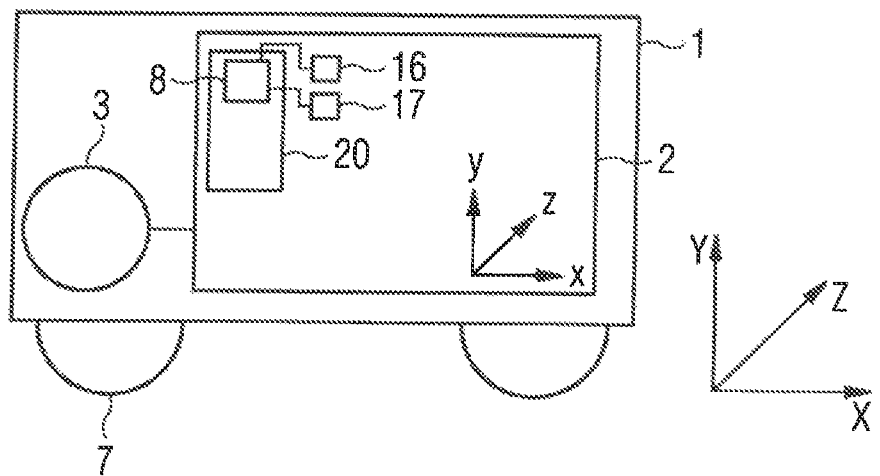
FIG. 4 shows a further embodiment variant of the automatically guided vehicle.

FIG. 4 shows a further embodiment variant of the automatically guided vehicle.

Shown are the two sensors 16 and 17, these being designed as acceleration sensors. The sensors 16 and 17 are designed to detect all three directions x, y and z. This is advantageous as fewer sensors are required.

The figure also shows that the evaluation unit 8 is comprised in a control unit 20 of the travel converter 2 or is integrated in the control unit 20.

Figure 5:
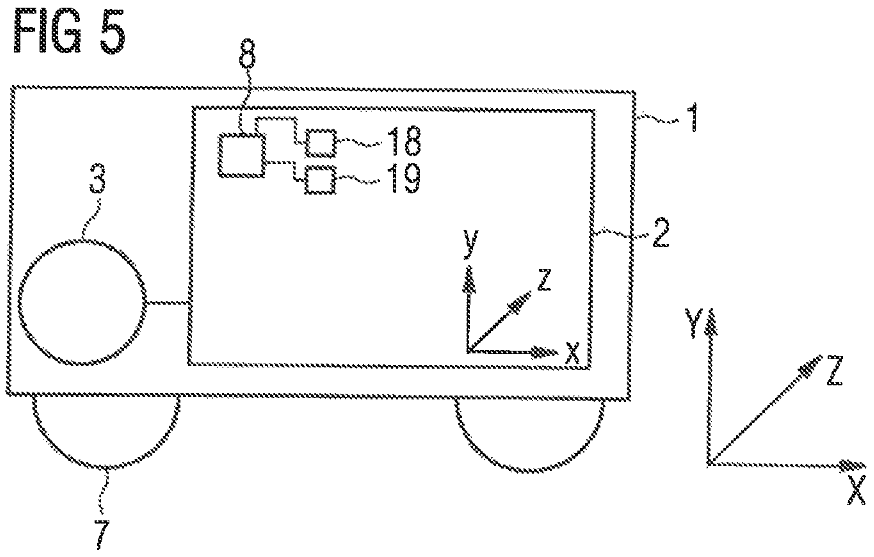
FIG. 5 shows a further embodiment variant of the automatically guided vehicle.

FIG. 5 shows a further embodiment variant of the automatically guided vehicle.

Illustrated are the sensors 18 and 19, designed as spatial location sensors in this embodiment. The redundant embodiment provides greater security of measurement.

It is possible to combine spatial location sensors and acceleration sensors (not illustrated), for example, two spatial location sensors and two acceleration sensors within a travel converter. This is particularly reliable.

The invention claimed is:

1. An automatically guided floor-bound transport vehicle which is automatically controlled and guided in a contact-free manner, the automatically guided vehicle comprising:

a travel drive comprising a travel converter and a dynamo-electric machine, with the travel converter comprising a printed circuit board, and with the dynamo-electric machine being connected to wheels of the vehicle; and at least two redundant sensors for each of x, y and/or z directions and designed to detect an acceleration of the vehicle in x, y and/or z direction or to detect a spatial location of the vehicle, the sensors being arranged or formed in the travel converter on the printed circuit board of the travel converter, an evaluation unit implemented in the travel converter and having two channels designed to evaluate the detected acceleration in x, y and/or z direction or to evaluate the detected spatial location.

2. The automatically guided vehicle of claim 1, further comprising a shaft to connect the dynamo-electric machine to the wheels of the vehicle.

3. The automatically guided vehicle of claim 1, wherein at least one of the two sensors is designed as an acceleration sensor.

4. The automatically guided vehicle of claim 1, wherein at least one of the two sensors is designed as a spatial location sensor.

5. The automatically guided vehicle of claim 1, wherein at least one of the two sensors is designed as a gyroscope.

6. The automatically guided vehicle of claim 1, further comprising at least one sensor per direction, wherein the at least one sensor is designed to detect the acceleration of the vehicle in x, y and/or z direction.

7. The automatically guided vehicle of claim 1, wherein the travel converter is mechanically connected to the vehicle.

8. A travel converter for an automatically guided floor-bound transport vehicle which is automatically controlled and guided in a contact-free manner, the travel converter comprising:

a printed circuit board;

at least two redundant sensors for each of x, y and/or z directions and designed to detect an acceleration of the vehicle in the x, y and/or z direction or to detect a spatial location of the vehicle, said sensors being arranged or formed in the travel converter on the printed circuit board of the travel converter, and an evaluation unit implemented in the travel converter and having two channels designed to evaluate at least one detected acceleration in x, y and/or z direction or to evaluate the detected spatial location.

* * * * *